United States Patent [19]

Ohara

[11] Patent Number: 5,910,770
[45] Date of Patent: Jun. 8, 1999

[54] TAG FOR THEFT PREVENTION

[75] Inventor: Jiro Ohara, Osaka, Japan

[73] Assignees: UNI Electronics Industry Co., Ltd., Osaka; Shiro Ohara, Hyogo; Yasushi Ohara, Tokyo, all of Japan

[21] Appl. No.: 09/060,978

[22] Filed: Apr. 16, 1998

[30] Foreign Application Priority Data

Aug. 22, 1997 [JP] Japan ..................................... 9-226352
Jan. 28, 1998 [JP] Japan .................................. 10-015412

[51] Int. Cl.⁶ ................................................. G08B 13/187
[52] U.S. Cl. ................................... 340/572.5; 340/572.8; 340/693.5
[58] Field of Search ................................... 340/572, 551, 340/693, 572.5, 572.8, 693.5

[56] References Cited

U.S. PATENT DOCUMENTS

| | | | |
|---|---|---|---|
| 4,811,000 | 3/1989 | Humphrey et al. | 340/572 |
| 5,349,331 | 9/1994 | Sieber et al. | 340/572 |
| 5,699,047 | 12/1997 | Tsai et al. | 340/572 |
| 5,760,689 | 6/1998 | Holmgren | 340/693 |

*Primary Examiner*—Glen Swann
*Attorney, Agent, or Firm*—Armstrong, Westerman, Hattori, McLeland & Naughton

[57] ABSTRACT

A tag for theft prevention is provided for decreasing the porion covering the inside of a container case as much as possible while being capable of carrying out detection without being affected adversely by a recording medium. The tag for theft prevention includes a detecting circuit which is positioned at the circumference edge of at least one of the sides of a container case in the thickness direction of the recording medium and is capable of detecting electric waves. Further, it includes a resonating circuit which is positioned in one specific side perpendicular to one side of the container case and is closely positioned with the detecting circuit or is connected to the detecting circuit in a theft preventing system which can detect whether or not electric wave absorption occurs by the passage of the resonating circuit provided on the container case containing a recording medium such as a CD or a protective case covering the container case, between a gate with a built-in transmission antennae and another gate with a built-in receiving antennae.

4 Claims, 3 Drawing Sheets

(a)

(b)

5,910,770

TAG FOR THEFT PREVENTION

BACKGROUND OF THE INVENTION

1. Field of the Invention

The present invention relates to a tag for theft prevention. More specifically, the invention relates to a tag for theft prevention which is used for preventing a recording medium from being taken away unjustly from a shop. The tag for theft prevention is provided inside a container case containing a recording medium such as a compact disk (CD), a mini disk (MD), a digital video disk (DVD) or a video tape, or provided on a protective case covering a container case for preventing the container case from being damaged. As a result, when a container case or a protective case which is displayed on displaying shelves, etc. in a retail shop and a rental video shop, etc. passes between a transmitting antenna and a receiving antenna to be taken away, the tag is detected so as to prevent the recording medium from being taken away unjustly.

2. Description of the Related Art

In order to prevent theft of a recording medium from a shop, a sheet-type tag, for example, is directly stuck to a container case of a recording medium or a sheet-type tag stuck to a transparent sheet is put in a transparent bag together with a compact disk (CD) being an example of the recording medium. However, neither of the above-described cases is complete because a tag is pealed off or a transparent sheet is drawn out. The related art is further described with reference to a CD as an example.

In order to overcome this problem, a sheet-type tag is stuck inside a protective case having a locking mechanism and then a container case containing a CD is fixed inside the protective case to make it impossible to have the sheet-type tag stuck to inside the protective case pealed off and prevent the CD from being taken away unjustly. Further, the container case containing the CD (goods) is handed to a purchaser after the locking mechanism is released when the purchaser takes the protective case containing the container case to, for example, a cashier and pays the price.

The above-described container case (hereinafter referred to as a "CD case") consists of transparent plastic so that titles of music and commentaries inside the above-described container case can be read and the protective case consists of transparent plastic so that titles of music and commentaries inside the CD case can be read through the protective case as well.

The above-described tag is provided with a resonating circuit comprising a coil arranged in a curled or coiled state and a capacitor arranged in the central portion of the coil while connected to the coil and a cover made of thin paper for hiding both inside and outside of the coil and the capacitor and is structured so that it can be stuck and fixed inside the protective case by a sticking portion provided on one of both sides of the above-described cover made of paper.

When a sticker-type tag is stuck inside a CD case as described above, a specific portion of the CD case corresponding to the portion to which the sticker-type tag is stuck is covered and titles of music and commentaries, etc. of the specific portion inside the CD case cannot be seen, which causes an inconvenience disadvantageous to a shop such as a decline of purchasing volition of some purchasers. Further, since the number of windings of a coil must be multiple in order to secure the detection sensitivity to a certain extent, the above-described portion to be covered becomes inevitably large and promotes the above-described inconvenience and therefore there has been room to improve.

Further, an aluminum evaporated CD affects the detection sensitivity of a sticker-type tag adversely because the sticker-type tag stuck inside a protection case overlaps with the CD on the thickness direction, which causes the decrease of the detection sensitivity of the sticker-type tag as well. Incidentally, although it can be considered to stick a sticker-type tag to inside the protective case so that the sticker-type tag is placed on the surface of the corner portion of a CD case, since the sticker-type tag has relatively large size as described above, the sticker-type tag cannot be contained in the corner portion of the CD case and there inevitably is a portion overlapping the CD, which has made it impossible to avoid the decrease of the detection sensitivity of the above-described sticker-type tag.

In addition, since the above-described sticker-type tag has directivity, it cannot be detected in some cases depending on an angle in passing between the transmission antenna and the receiving antenna, which has left room to improve.

SUMMARY OF THE INVENTION

The present invention has been made in view of the above described circumstances, and therefore, an object of the invention is to provide a tag for theft prevention which can decrease the portion covering inside of a container case as much as possible while being able to be detected without being affected adversely by recording media.

In order to solve the above-mentioned object, the present invention provides a tag for theft prevention comprising a detecting circuit which is positioned at the circumference edge of at least one of both sides of a container case in the thickness direction of the recording medium to be able to detect electric waves and a resonating circuit which is positioned in one specific side crossing with one side of the above-described container case and is closely positioned with the above-described detecting circuit or is connected to the detecting circuit in a theft preventing system which can detect whether or not electric wave absorption occurs by the passage of the above-described resonating circuit provided on the above-described container case containing a recording medium such as a CD or a protective case covering the container case between a gate with a built-in transmission antenna and the other gate with a built-in receiving antenna.

Therefore, since the resonating circuit, provided with the detecting circuit which is positioned in the circumference edge of at least one of both sides of the above-described container case in the thickness direction of the recording medium and is capable of detecting electric waves, not only can directly absorb electric waves from the transmission antenna but also can indirectly absorb detected electric waves from the transmission antennae detected by the detecting circuit, the directivity of the tag can be increased. Moreover, the fact that the detecting circuit is positioned in the circumference edge of one side of the container case not only can make the portion that is covered with the tag nonexisting or nearly nonexisting but also can make the tag not easily affected by the recording medium. Further, turning attention to the fact that the distance for arranging the detecting circuit can be secured at maximum even in the container case, the detection sensitivity can certainly be improved while the number of windings of a coil forming the detecting circuit is kept small. In addition, since the resonating circuit is positioned on the other side crossing with one side of the container case, interference between tags is little and the situation in which electric wave absorption cannot be attained due to extreme change of the resonating frequency of the tags can be certainly avoided even if a plurality of container cases are piled up.

Since a coil and a capacitor can be embedded in the above-described protective case when it is molded by forming the protective case of synthetic resin and insert-molding the above-described detecting circuit and resonating circuit in the protective case, it becomes unnecessary for salesclerks to stick a sticker-type tag to the protective case as conventionally done and the work load of the salesclerks especially just before an opening of the shop can be eased.

By using a chip capacitor as the above-described capacitor, the capacitor can easily be embedded in the container case without increasing the thickness of the container case or the protective case and the area of the container case for a recording medium covered with the chip capacitor can be small.

The tag for theft prevention is characterized in that the above-described protective case consists of synthetic resin, the above-described detecting circuit and resonating circuit comprises coils and capacitors, respectively, formed by evaporating or printing metal on the surface of a sheet member and the above-described sheet member is stuck to the protective case.

That is to say, the tag for theft prevention can be installed by simply sticking the sheet member to the protective case. Moreover, since the tag for theft prevention is a coil or a capacitor formed by evaporating or printing metal on the thin sheet member, the possibility that an internal containing space of the protective case is made small by the tag for theft prevention is reduced and the tag for theft prevention can be installed without changing the size of the protective case.

BRIEF DESCRIPTION OF THE DRAWINGS

The invention will be described below in detail with reference to the accompanying drawings, in which.

DETAILED DESCRIPTION OF THE PREFERRED EMBODIMENTS

Figure 1:
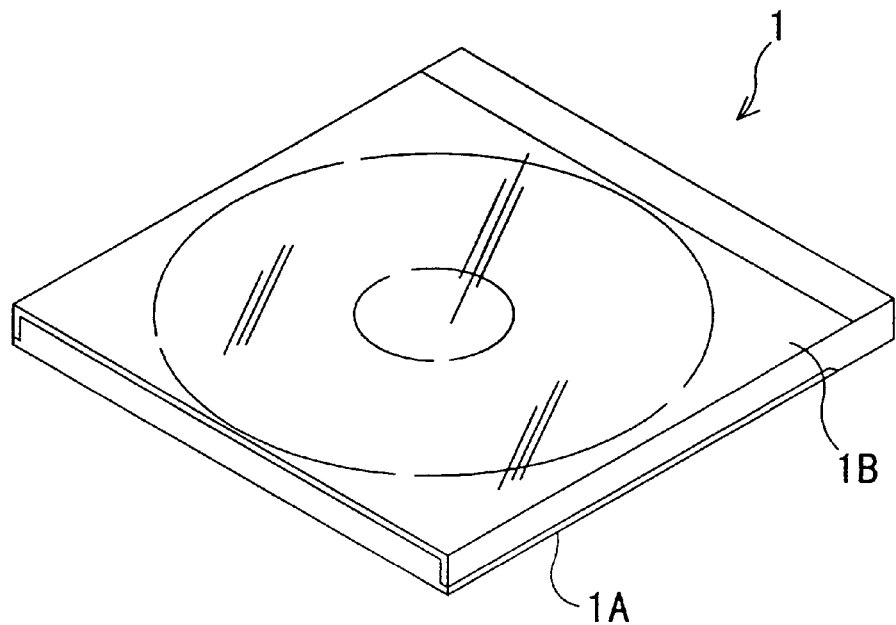
FIG. 1 is a perspective view of a protective case and a CD case according to the present invention.
Figure 1:
Figure 1:
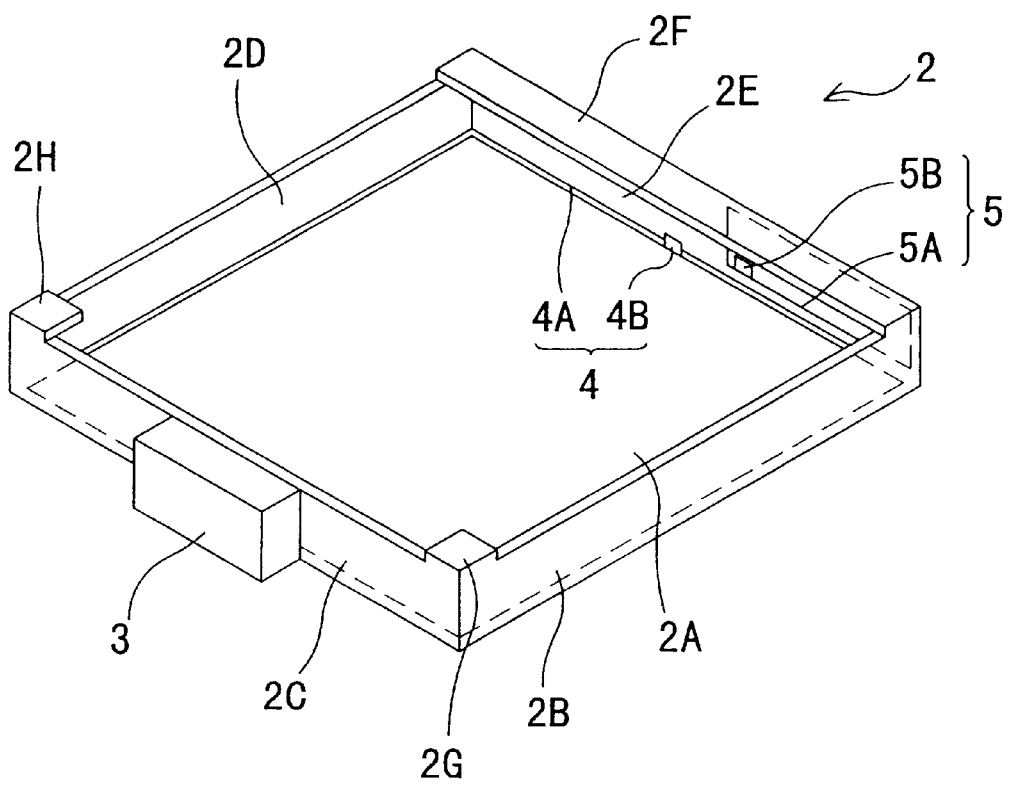

A CD case 1 consisting of transparent synthetic resin, which contains a compact disk (CD) to be displayed for example in a rental video shop, etc., and a protective case 2 for covering the CD case 1 are shown in FIG. 1. The CD case 1 is put into the protective case 2 not only for preventing the CD case 1 from being easily damaged but also for preventing a tag provided on the protective case 2 described below from being pealed off.

The above-described protective case 2 comprises: a rectangular bottom plate portion 2A contact-supporting a backside 1A of the CD case 1; four rectangle side plate portions 2B, 2C, 2D and 2E covering the circumference surface of the CD case 1; a connecting plate portion 2F connecting the respective end portions of the pair of parallel side plate portions 2B and 2D in order for the connecting plate portion 2F to contact with a part of a open-close oscillating lid 1B forming the front side of the CD case 1; and corner plate portions 2G and 2H provided in the corner portions between the above-described side plate portions 2B and 2C and between 2C and 2D, and is integrally formed of transparent synthetic resin.

Further, the above-described specific side plate portion 2C is provided with a locking device 3 which is locked by inserting the CD case 1 in the protective case 2 and thereby prevents the CD case 1 from being removed from the protective case 2. The CD case 1 is in this way displayed in the display shelves of a rental video shop while fixed inside the protective case 2, and after the price is paid at a cashier the locking device 3 is operated to be released and the CD case 1 (goods) is handed to a purchaser. The above-described protective case 2 may comprise a case body which can contain the CD case 1 and a lid body which can open and close freely covering the opening portion of the case body but concrete structures of the protective case 2 are not limited to these and are implemented with a locking mechanism which makes opening and closing of the above-described lid body impossible. The locking mechanism is also operated to be released and the CD case 1 (goods) is handed to a purchaser after the price is paid at the cashier as described above.

The tag for theft prevention comprises: a detecting circuit 4 for detecting electric waves, provided in a circumference edge portion of the bottom plate 2A of the above-described protective case 2; and a resonating circuit 5 for conducting absorption of electric waves, provided in the side plate portion 2E which is parallel with the side plate portion 2C having the locking device 3. For example, when the protective case 2 containing the CD case 1 is tried to be taken away from the shop, it necessarily passes between a pair of gates provided around the entrance of the shop. The pair of gates which is not shown comprises a gate with a built-in transmission antenna and a gate with a built-in receiving antenna. Therefore, when the protective case 2 containing the CD case 1 passes between the pair of gates, electric waves from the transmission antenna are absorbed by the resonating circuit 5 and the resonating frequency received by the receiving antenna coincides with set resonating frequency, and thereby a salesclerk, etc. is informed that the protective case 2 containing a CD case 1 is being taken away to effect theft prevention. At this time, the above-described detecting circuit 4 detects that it cannot detect the passing of the protective case 2 depending on the angle of the protective case 2 passing between the gates and the resonating circuit 5 is made to absorb the detected electric waves to thereby increase the directivity and enlarge the area of detection. By providing the resonating circuit 5 on the specific side plate portion 2E as described above, the possibility of resonating circuits 5 interfering with each other can be small and the extreme change of the resonating frequency can be controlled, even if a plurality of protective cases 2 piles up in the thickness direction.

Figure 3:
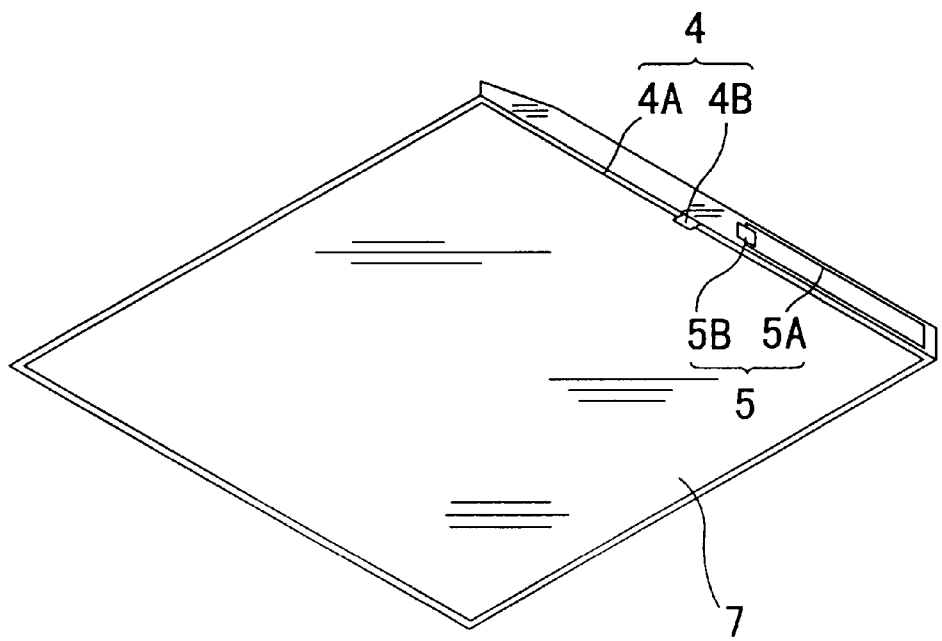
FIG. 3 is a perspective view showing another form of a tag according to the present invention.

Shown in FIG. 1 is a case in which the detection circuit 4 and the resonating circuit 5 are insert-molded into the protective case 2 when the above-described protective case 2 is molded, in which case there is an advantage that the work for installing the circuits in the protective case 2 can be unnecessary, but as shown in FIG. 3, the detecting circuit 4 and the resonating circuit 5 may be fixed on a transparent synthetic resin film 7 by an adhesive agent, etc. to stick the film 7, on which the detecting circuit 4 and the resonating circuit 5 are fixed, to inside the above-described protective case 2 or the above-described CD case 1, or the detecting circuit 4 and the resonating circuit 5 may be insert-molded in the CD case 1 when the CD case 1 is molded. In this case, the open-close lid 1B of the CD case 1 is implemented with a locking mechanism for making opening and closing of the above-described lid body impossible as described above. As shown in FIG. 3, the above-described film 7 may be made of not only a material with flexibility but also a material without flexibility.

Figure 2:
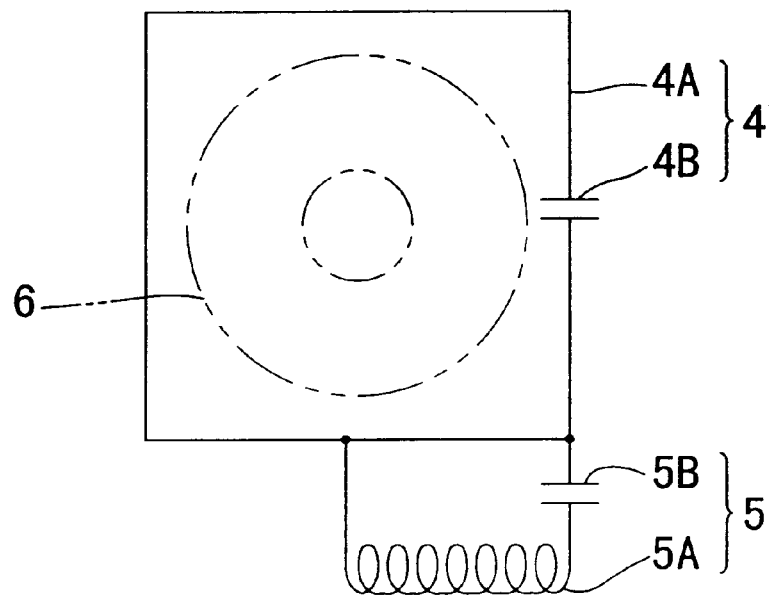
FIG. 2A is a schematic view showing a status in which a detecting circuit and resonating circuit of the invention are connected to each other.
FIG. 2B is a schematic view showing a status in which the detecting circuit and resonating circuit of the invention are closely arranged.
Figure 2:
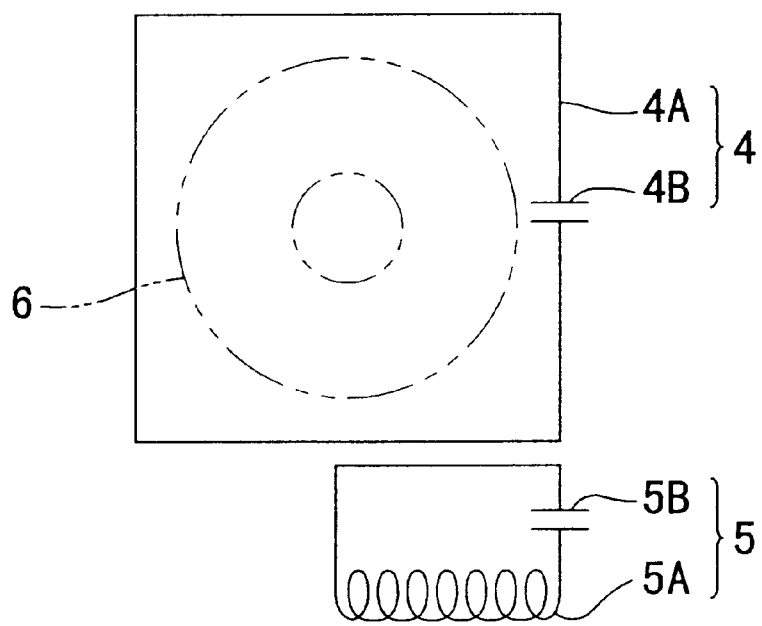

To describe the above-described detecting circuit 4 and the resonating circuit 5 more in detail, as shown in FIG. 2A, the detecting circuit 4 comprises a coil 4A forming a loop positioned outside a CD 6 and a capacitor 4B connected to the coil 4A, and the resonating circuit 5 comprises a coil 5A wound multiple times, which is drawn as if it was on the same surface with the above-described detecting circuit 4 for convenience of viewing, and a capacitor 5B connected to the coil 5A, and the detecting circuit 4 and the resonating circuit 5 are connected. Forming the above-described capacitors 4B and 5B of chip capacitors makes it possible to further reduce the size of the area covering the container case and has an advantage that the thickness of the protective case 2 is not required to be larger than necessary. The above-described detecting circuit 4 and resonating circuit 5 may be arranged in a closely positioned state with each other as shown in FIG. 2B without being connected. Further, the number of windings of the above-described coil 4A may be more than a single winding.

Figure 4:
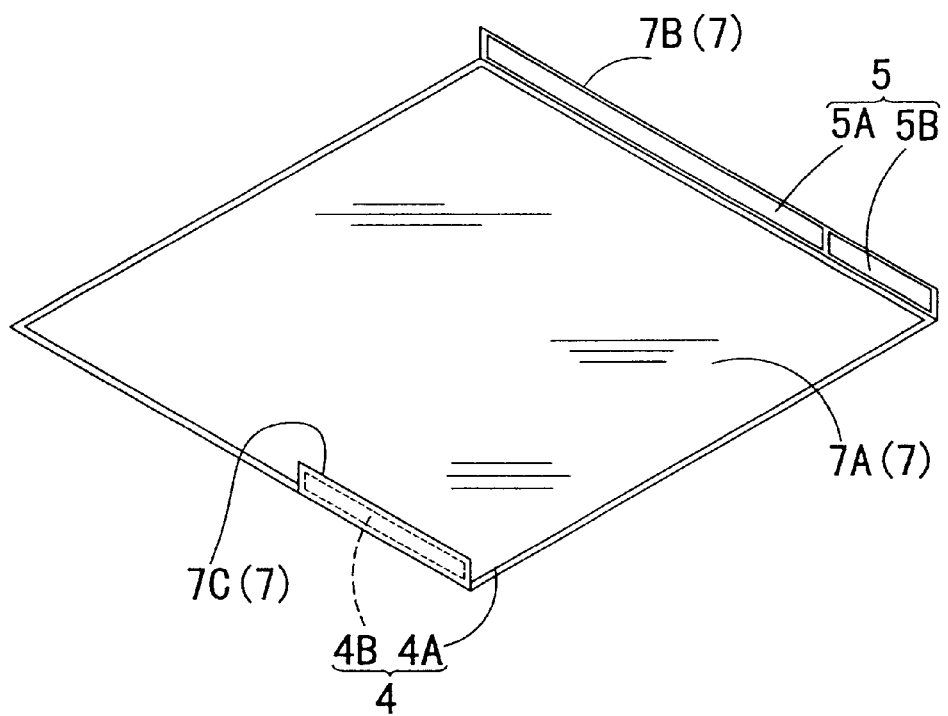
FIG. 4 is a perspective view showing another form of a tag of the invention.

As shown in FIG. 4, the above-described detecting circuit 4 and resonating circuit 5 may comprise a coil 4A or 5A formed by evaporating or printing metal on the surface of the above-described film 7 as a sheet member (for easy understanding, it is wound one time in the figure) and a capacitor 4B or 5B, respectively, with the above-described film 7 stuck to inside the protective case 2. Other than providing the above-described film 7 with the coil 4A or 5A and the capacitor 4B or 5B by directly evaporating or printing them on the surface of the above-described film 7, a sheet with the coil 4A or 5A and the capacitor 4B or 5B on its surface may be stuck to the film 7. The above-described film 7 comprises a rectangular flat plate portion 7A with the largest area, support flat plate portions 7B and 7C each having different sizes extending from two opposing sides among four sides of the circumference of the flat plate portion 7A to the directions 90 degrees different from each of the two sides, and the above-described coil 4A is arranged in the vicinity of the circumference edge of the flat plate portion 7A, the above-described coil 5A and capacitor 5B are arranged in the larger support flat plate portion 7B and the capacitor 5B is arranged in the smaller support flat plate portion 7C. In the figure, although the capacitor 4B of the detecting circuit 4 and the capacitor 5B of the resonating circuit 5 are arranged in parallel, this arrangement does not affect the detection of electric waves at all because the portion absorbing electric waves is the coil 4A or 5A. The number of windings of the above-described coil 4A or 5A may be more than a single winding. The above-described film 7 may consist of a material other than plastic such as paper and glass.

The present invention can be adapted to various kinds of recording media other than a CD, such as a video tape, a mini disk (MD), a digital video disk (DVD).

According to a first aspect of the present invention, detection in such angles that have been deemed to be impossible to make detection becomes possible and prevention of theft can be certainly conducted by providing a detecting circuit for detecting electric waves separately from a resonating circuit. Moreover, this not only can decrease the portion of a container case covered with the detecting circuit and the resonating circuit as much as possible, but also can certainly avoid the decrease of the detection sensitivity due to the covered portion of a container without being affected adversely by a recording medium. Further, the detection sensitivity can be certainly improved while decreasing the number of windings of a coil making up the detecting circuit by placing the detection circuit at the circumference edge of the container case. In addition, interference between tags hardly occurs and the detection for theft prevention can be certainly attained even if a plurality of tags are piled up by providing the resonating circuit in the crossing direction, with regard to the thickness direction of the container case.

According to a second aspect of the present invention, it becomes unnecessary to stick a sticker-type tag to the protective case as conventionally done and the work load for sticking a large number of sticker-type tags to protective cases especially just before an opening of the shop can be eliminated by insert-molding the detecting circuit and the resonating circuit in the protective case, thus a tag for theft prevention can be provided which is highly advantageous for a shop.

According to a third aspect of the present invention, the size of the area covering a container case can be further reduced and there is an advantage that the thickness of the protective case 2 is not required to be larger than necessary by using a chip capacitor as a capacitor.

According to a fourth aspect of the present invention, a tag for theft prevention can be installed by simply sticking a sheet member to a protective case. Moreover, since the tag for theft prevention is a coil and a capacitor formed by evaporating or printing metal on a thin sheet member, the possibility that an internal containing space of the protective case is made small by the tag for theft prevention is reduced and the tag for theft prevention can be installed without changing the size of the protective case. Further, as in the second aspect of the present invention, since the sheet member not only can be mass-produced compared with insert-molding, but also does not require precise accuracy at the time of manufacturing, production costs can be lowered and the popularization of the tag for theft prevention can be increased.

Thus, it is seen that a tag for theft prevention is provided. One skilled in the art will appreciate that the present invention can be practiced by other than the embodiments which are presented for purpose of illustration, and not of limitation, and the present invention is limited only by the claims which follow.

What is claimed is:

1. In a theft preventing system in which whether or not electric wave absorption occurs due to the presence of a resonant circuit between a gate with a built-in transmission antenna and another gate with a built-in receiving antenna can be detected, which resonant circuit is provided on a container case containing a recording medium such as a CD or on a protective case covering the container case, a tag for theft prevention, comprising:

a detecting circuit which is positioned at a circumference edge of at least one of the sides of the container case or protective case parallel to the surface of the recording medium, and is capable of detecting electric waves; and a resonating circuit which is positioned in one specific side perpendicular to said parallel sides of the container case or protective case, and is closely positioned with or connected to said detecting circuit.

2. The tag for theft prevention as claimed in claim 1, wherein the protective case consists of synthetic resin, and said detecting circuit and said resonating circuit are insert-molded into the protective case at the time of molding the protective case.

3. The tag for theft prevention as claimed in claim 1 or 2, wherein said detecting circuit and said resonating circuit comprise coils and capacitors, respectively, and chip capacitors are used as the capacitors.

4. The tag for theft prevention as claimed in claim 1, wherein the protective case consists of synthetic resin, said detecting circuit and resonating circuit comprise coils and capacitors formed by evaporating or printing metal on the surface of a sheet member, respectively, and the sheet member is stuck to the protective case.

* * * * *